United States Patent
Yang

Patent Number: 5,525,390
Date of Patent: Jun. 11, 1996

[54] ADHESIVE TAPE

[76] Inventor: Chi-Yu Yang, No. 81, Lane 292, Wen Hsien Road, Tainan City, Taiwan

[21] Appl. No.: 442,116

[22] Filed: May 16, 1995

[51] Int. Cl.⁶ .................................. B32B 3/10; B32B 3/02
[52] U.S. Cl. ............................ 428/41.6; 428/43; 428/41.9
[58] Field of Search ............................... 428/42, 43, 40, 428/41; 206/820

*Primary Examiner*—Alexander S. Thomas
*Attorney, Agent, or Firm*—Jones, Tullar & Cooper

[57] ABSTRACT

An adhesive tape including a strippable backing layer, a transparent intermediate layer having a back-glued first longitudinal half strippably attached to the top side the backing layer and a second longitudinal half suspended from the top side of the backing layer, and a covering layer with a distinctive color scheme fully covered on and fixedly secured to the top side of the second longitudinal half opposite to the backing layer, wherein parallel tear lines are transversely made on the covering layer and the intermediate layer to divide them into a plurality of linked stickers, permitting the linked stickers to be respectively separated from the backing layer through the tear lines.

1 Claim, 2 Drawing Sheets

ADHESIVE TAPE

BACKGROUND OF THE INVENTION

The present invention relates to adhesive tapes, and relates more particularly to such an adhesive tape which can be quickly and conveniently detached from the package to which it is adhered to seal the opening on the package.

In retail stores, when goods are packed by a boxes or sheet of wrapping paper, salesmen and saleswomen commonly use an adhesive tape to seal the package so that the client can pick up the package conveniently. However, it is difficult to detach the adhesive tape from the package when to open it. Therefore, a knife or scissors must be used to cut open the package.

SUMMARY OF THE INVENTION

The present invention has been accomplished to provide an adhesive tape which eliminates the aforesaid problem. According to the present invention, the adhesive tape is comprised of a plurality of stickers linked by tear lines and attached to a strippable backing, each sticker having one end suspended from the top side of the backing and made with a distinctive color scheme for quick distinction.

DETAILED DESCRIPTION OF THE PREFERRED EMBODIMENT

Figure 1:
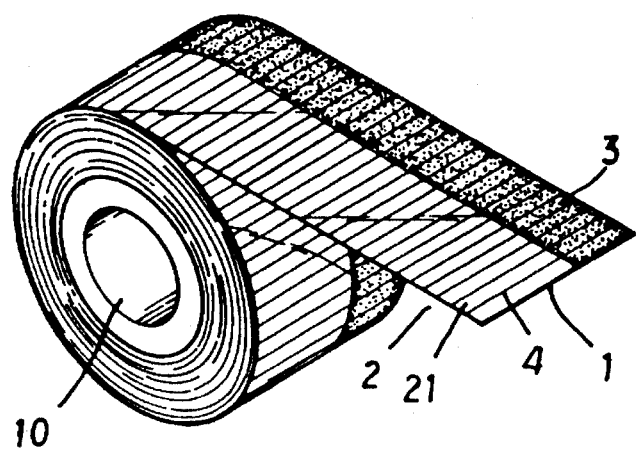
FIG. 1 is shows an adhesive tape according to the present invention.
Figure 2:
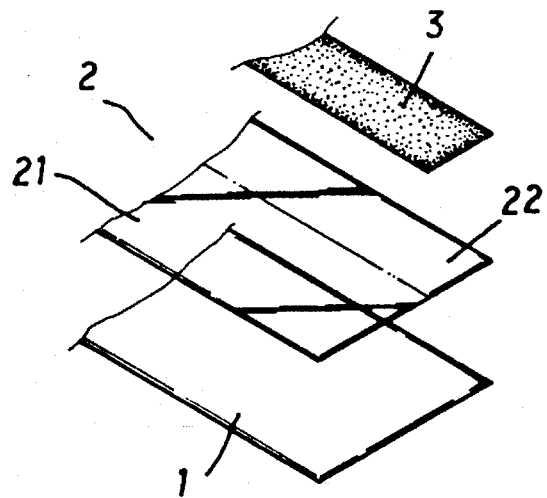
FIG. 2 is an exploded view of the adhesive tape shown in FIG. 1.
Figure 3:
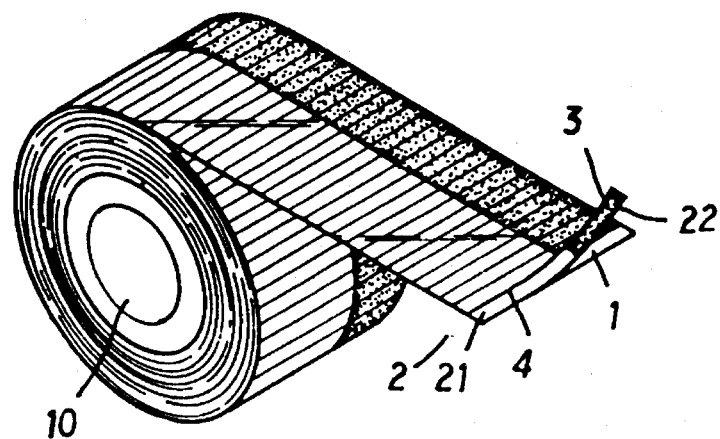
FIG. 3 shows an individual sticker detached from the adhesive tape.

Referring to FIGS. 1 and 2, the adhesive tape shown is wound round a barrel 10, comprised of a flexible strippable backing layer 1, a transparent intermediate layer 2, and a colored covering layer 3. The backing layer 1 and the intermediate layer 2 are of equal width. The width of the covering layer 3 is relatively narrower than that of the backing layer 1 and the intermediate layer 2. The intermediate layer 2 is longitudinally divided into a first part 21 and a second part 22. The bottom side of the first part 21 and the top side of the second part 22 are respectively covered with a layer of glue. The width of the second part 22 is equal to that of the covering layer 3. Therefore, the covering layer 3 can be fully adhered to the top side of the second part 22 of the intermediate layer 2. Because the top side of the first part 21 and the top side of the covering layer 3 are not adhesive, the whole assembly of the adhesive tape does not stick and can be wound round the barrel 10. Parallel tear lines 4 are transversely made on the covering layer 3 and the intermediate layer 2. Therefore, the covering layer 3 and the intermediate layer 2 are combined together and formed into a series of stickers linked by the tear lines 4. Through the tear lines, the stickers can be respectively detached from the backing layer 1 (see FIG. 3).

Figure 4:
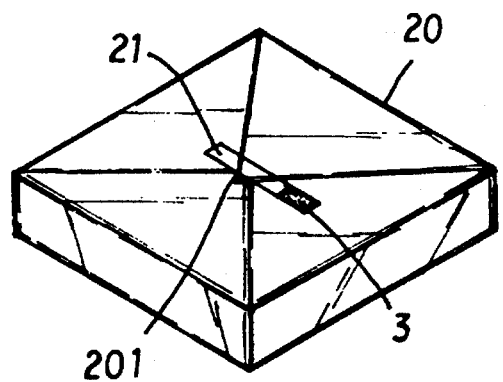
FIG. 4 shows a package sealed by an individual sticker according to the present invention.

Referring to FIG. 4, when an individual sticker is detached from the backing 2, the back-glued first part 21 of the intermediate layer 2 of the individual sticker is adhered to the package 20 to seal its opening 201. When the individual sticker is adhered to the package 20, the second part 22 of the individual sticker is suspended from the package 20 and the colored covering layer 3 is still adhered to the second part 22. Because the covering layer 3 has a distinctive color, one can easily find tip to hold when to detach the sticker from the package 20.

As indicated above, when an individual sticker is adhered to a package to seal its opening, the sticker has one end with a distinctive color suspended from the package for quick distinction so that the sticker can be quickly and easily detached from the package when to open the package.

It is to be understood that the drawings are designed for purposes of illustration only, and are not intended as a definition of the limits and scope of the invention disclosed.

I claim:

1. An adhesive tape comprising a strippable backing layer, a covering layer, and a transparent intermediate layer retained between said backing layer and said covering layer, wherein said intermediate layer is longitudinally divided into a first part and a second part, said first part having a bottom side covered with a layer of glue strippably attached to said backing layer, said second part having a top side covered with a layer of glue and securely adhered to said covering layer; said covering layer is of equal width relative to said second part of said intermediate layer and fixedly adhered to the top side of said second part of said intermediate layer, having a distinctive color scheme; parallel tear lines are transversely made on said covering layer and said intermediate layer to divide said covering layer with said intermediate layer into a plurality of linked stickers permitting said linked stickers to be respectively separated from said backing layer through said tear lines.

* * * * *